INVENTOR
ROYAL W. ECKSTEIN, JR.

BY
ATTORNEY

United States Patent Office 3,500,152
Patented Mar. 10, 1970

3,500,152
REMOTE CONTROL RECEIVER FOR OPERATING A MOTOR WITH A SUPERREGENERATIVE DETECTOR, BANDPASS AMPLIFIER AND DC MOTOR DRIVE AMPLIFIER
Royal W. Eckstein, Jr., Indianapolis, Ind., assignor to Industrial Electronics, Inc., Indianapolis, Ind., a corporation of Indiana
Filed June 6, 1967, Ser. No. 643,942
Int. Cl. H02p 7/00
U.S. Cl. 318—16                 4 Claims

ABSTRACT OF THE DISCLOSURE

Radio-controlled D.C. motor in which a tone-modulated R.F. carrier wave is amplified and demodulated by a superregenerative detector, the recovered tone modulation being selectively passed by a narrow band amplifier, rectified, filtered, and amplified to drive the motor. The rectifier incorporates a threshold circuit to prevent spurious operation of the motor by noise.

---

This invention relates to remote control apparatus, and more particularly to apparatus including a DC motor and a fully transistorized receiver for driving the motor in response to tone-modulated radio waves.

Although the art is replete with radio-controlled electric motors, a need has nevertheless remained for simple, compact, low-cost, apparatus for driving small DC motors, such as those used for steering model boats, in response to tone-modulated RF carriers. The apparatus must have high sensitivity and yet high immunity from response to spurious stimuli. Prior apparatus has been deficient in one or more of these respects.

It is accordingly a principal object of the present invention to provide improved, solid-state, apparatus for driving an electric motor in response to amplitude-modulated radio waves.

More specifically, it is an object of the invention to provide apparatus of the foregoing type for receiving a tone-modulated RF carrier, recovering the tone modulation, and producing DC for driving an electric motor in response to the tone signal, while avoiding response to spurious signals or noise.

Briefly stated, the apparatus of the present invention comprises a superregenerative detector having its input connected to a receiving antenna and producing at its output a signal corresponding to the tone modulation of a received radio frequency carrier. The tone signal is amplified by a highly selective narrow band amplifier, the output of which is applied to a rectifier having a circuit providing a threshold which must be exceeded before an output is produced. The output of the rectifier is filtered and applied to a DC amplifier which is OFF in the absence of the tone signal but which is turned fully ON when the signal is present, in order to drive a DC motor.

Figure 1:
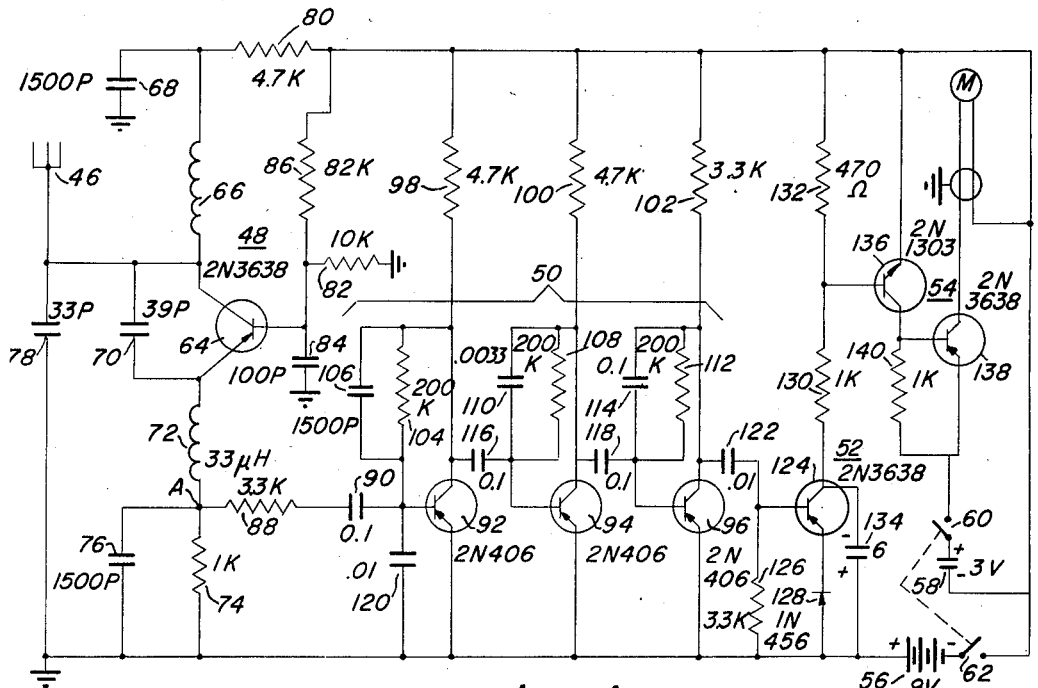
Figure 2:
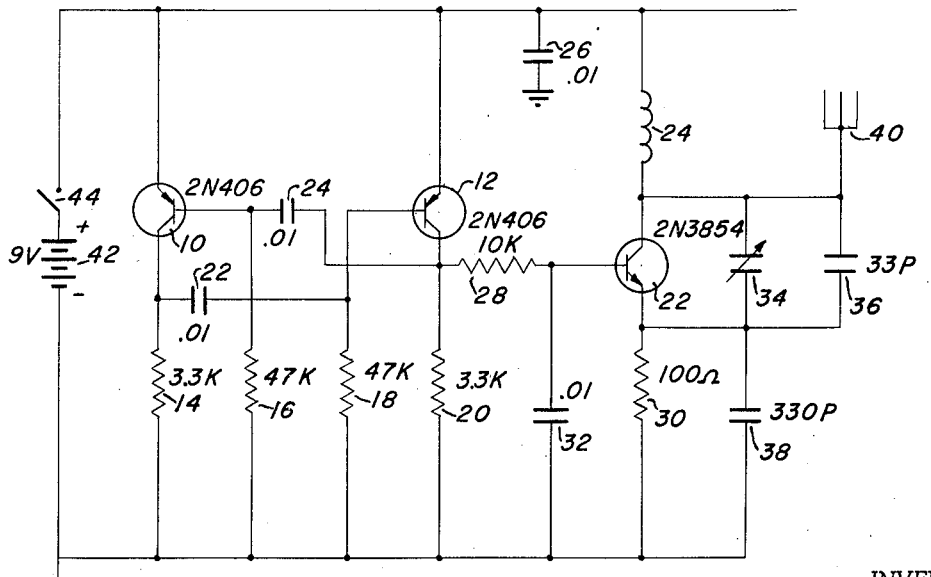

The foregoing and other objects, advantages and features of the invention will become more readily apparent from consideration of the following detailed description of the invention taken in conjunction with the accompanying drawing, which illustrates a preferred and exemplary embodiment, and wherein:

FIGURE 1 is a schematic diagram of the radio-controlled apparatus of the invention; and FIGURE 2 is a schematic diagram of a typical transmitter which may be employed to generate the radio signal employed in the invention.

The remote control receiver apparatus of the invention is controlled by a tone-modulated RF carrier. Typically, an RF carrier of 27 megacycles per second is modulated by a thousand cycle per second tone. A suitable transmitter for generating the amplitude-modulated RF carrier is shown in FIGURE 2. Transistors 10 and 12, resistors 14, 16, 18 and 20, and capacitors 22 and 24 form a well known free-running multivibrator. Transistor 22 and its associated components, including inductance 24, capacitor 26, resistors 20, 28, and 30, and capacitors 32, 34, 36 and 38 form a radio frequency oscillator (of the Clapp type) which generates a radio frequency carrier at a frequency of about 27 megacycles per second. Capacitor 34 serves to adjust the frequency, so that the carrier frequency is the same as the frequency to which the receiver of the invention is tuned. The output of the multivibrator circuit is coupled through resistor 28 to the base of transistor 22. This drives transistor 22 ON and OFF at 1000 c.p.s. The result is a transmitted signal that is 100% amplitude modulated at a 1000 c.p.s. rate. The RF energy is coupled directly from the collector of transistor 22 to an antenna 40, which may be of the helicoil type. The transmitter may be energized from a battery 42 through an ON-OFF switch 44. The values and component types given in FIGURE 2 are typical.

Turning now to FIGURE 1, the purpose of the receiving apparatus of the invention is to control the operation of a motor M remote from the transmitter. The receiving apparatus comprises an antenna 46, a superregenerative detector 48, a three-stage narrow band amplifier 50, a detector or rectifier 52 and a DC amplifier 54. Batteries 56 and 58 supply electric power under the control of ganged switches 60 and 62.

The superregenerative detector or receiver 48 comprises a transistor 64, the collector of which is connected to antenna 46 and through an inductance 66 and a capacitor 68 to a point of reference potential, such as ground or chassis potential. A capacitor 70 is connected between the emitter and the collector, and the emitter is connected through an inductance 72 and a parallel RC circuit, including resistor 74 and capacitor 76, to ground (the positive side of battery 56). A capacitor 78 is connected between the antenna and ground. The junction of inductance 66 and capacitor 68 is connected through a resistor 80 to the negative side of battery 56. The base of transistor 64 is connected through an RC circuit, including resistor 82 and capacitor 84, to ground and is connected through a resistor 86 to the negative side of battery 56.

The superregenerative detector 48 is a self-quenching oscillator (generally of the Clapp type) with a quench frequency beyond the audio range. It is tuned to receive and amplify the 27 megacycle per second tone-modulated carrier waves from antenna 46 and to reproduce at point A the 1000 c.p.s. tone signal. Antenna 46 may be a whip type, the length of which is chosen for maximum sensitivity to the RF crarier. Capacitor 70 adjusts the squelch sensitivity of the receiver, and coil 72 acts as an RF choke.

The 1000 c.p.s. tone at point A is coupled to the input of narrow band amplifier 50 by resistor 88 in series with capacitor 90. The amplifier comprises three cascaded stages, including transistors 92, 94, and 96. The emitters of the transistors are connected to the positive side of battery 56, while the collectors are connected through corresponding resistors 98, 100, and 102 to the negative side of the battery. The base of each transistor is connected to the corresponding resistors 98, 100 and 102 by parallel RC circuits, including, respectively, resistor 104 and capacitor 106, resistor 108 and capacitor 110, and resistor 112, and capacitor 114. The collector of transistor 92 is coupled by capacitor 116 to the base of transistor 94, while the collector of transistor 94 is coupled by capacitor 118 to the base of transistor 96. The signal input to transistor 92 is applied across a capacitor 120, connected between base and emitter of transistor 92, while the output from the amplifier is taken from the collector of transistor 96 through a coupling capacitor 122. The pass band of the amplifier 50 is limited so as to pass the 1000 c.p.s. tone with good selectivity. The low frequency cut-off of the amplifier is controlled by the coupling capacitors 90, 116, 118, and 122, while the high frequency cut-off is controlled by capacitors 106, 110, and 114.

The amplified audio signal at the collector of transistor 96 is coupled by capacitor 122 to the base of transistor 124 of the detector or rectifier 52. The base of transistor 124 is connected to the positive side of battery 56 through a resistor 126, while the emitter of transistor 124 is connected to the same point through a diode 128, the polarity of which is the same as the polarity of the base-emitter junction of transistor 124. The collector of transistor 124 is connected by resistors 130 and 132 in series to the negative side of battery 56. A filter capacitor 134 is connected between the collector and ground.

The combined voltage drop across the base-emitter junction of transistor 124 and the diode 128 in series established a threshold (for example, 1 volt) which must be exceeded before an output is obtained from transistor 124. This prevents spurious operation of the motor M in response to noise. Transistor 124 passes the negative half-cycles of the 1000 c.p.s. tone which exceed the threshold. Capacitor 134 filters the half-wave rectified audio signal.

The DC amplifier 54 comprises transistors 136 and 138. The base of transistor 136 is connected to the junction of resistors 130 and 132, while the emitter is connected to the negative side of batteries 56 and 58. The collector of transistor 136 is directly connected to the base of transistor 138 and is connected through resistor 140 and switch 60 to the positive side of battery 58. The emitter of transistor 138 is also connected to the positive side of battery 58, while the collector is connected to one terminal of motor M, the other terminal of which is connected to the negative side of battery 58. The sheath of the motor cable may be grounded as indicated.

The direct current supplied from detector 52 is amplified by the DC amplifier 54 and drives the motor M. Due to the high gain of transistors 124, 136, and 138, and due to the threshold circuit of detector 52, the motor is turned OFF when no signal is present and is turned fully ON when a signal is present. The possibility of spurious operation of the motor is further reduced by the narrow pass band of amplifier 50. The sensitivity of the superregenerative detector 48 ensures an adequate level of tone signal when the signal is present. Typical component types and values are illustrated.

While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative, rather than restrictive of the invention, and those modification which come within the meaning and range of equivalents of the claims are to be included therein.

The invention claimed is:

1. Remote control apparatus comprising in sequence, an antenna, a superregenerative detector, a narrow band amplifier, a rectifier, a filter, a DC amplifier, and a DC motor, said detector having means for receiving from said antenna a tone-modulated carrier wave and for applying to said narrow band amplifier a signal corresponding to the tone modulation, said narrow band amplifier having a pass band for selectively passing said signal to said rectifier, said rectifier producing pulsating DC from said signal, which is filtered by said filter, amplified by said DC amplifier, and applied to said motor for energizing it, said rectifier comprising a transistor having its base-emitter circuit connected to said narrow band amplifier and its collector-emitter circuit connected to said DC amplifier, said base-emitter circuit having a diode connected in series with the emitter, with the polarity of the diode the same as the polarity of the emitter-to-base path through the transistor, and electric supply means for biasing said base-emitter circuit to provide an amplitude threshold which must be exceeded by said signal in order to produce an output from said rectifier.

2. Remote control apparatus comprising in sequence, an antenna, a superregenerative detector, a narrow band amplifier, a rectifier, a filter, a DC amplifier, and a DC motor, said detector having means for receiving from said antenna a tone-modulated carrier wave and for applying to said narrow band amplifier a signal corresponding to the tone modulation, said narrow band amplifier having a pass band for selectively passing said signal to said rectifier, said rectifier producing pulsating DC from said signal, which is filtered by said filter, amplified by said DC amplifier, and applied to said motor for energizing it, said apparatus being completely solid-state, with said detector, said narrow band amplifier and said rectifier comprising transistors, said DC amplifier and said rectifier comprising transistors, said DC amplifier comprising a pair of cascaded transistor stages with complementary symmetry, said motor being in series with the collector-emitter path of the second stage of said DC amplifier.

3. Remote control apparatus comprising in sequence, an antenna, a superregenerative detector, a narrow band amplifier, a rectifier, a filter, a DC amplifier, and a DC motor, said detector having means for receiving from said antenna a tone-modulated carrier wave and for applying to said narrow band amplifier a signal corresponding to the tone modulation, said narrow band amplifier having a pass band for selectively passing said signal to said rectifier, said rectifier producing pulsating DC from said signal, which is filtered by said filter, amplified by said DC amplifier, and applied to said motor for energizing it, said narrow band amplifier having series coupling capacitors for controlling the low frequency cut-off and having shunt coupling capacitors for controlling the high frequency cut-off.

4. Remote control apparatus comprising in sequence, an antenna, a superregenerative detector, a narrow band amplifier, a rectifier, a filter, a DC amplifier, and a DC motor, said detector having means for receiving from said antenna a tone-modulated carrier wave and for applying to said narrow band amplifier a signal coresponding to the tone modulation, said narrow band amplifier having a pass band for selectively passing said signal to said rectifier, said rectifier producing pulsating DC from said signal, which is filtered by said filter, amplified by said DC amplifier, and applied to said motor for energizing it, said superregenerative detector comprising a transistor having an LC tuned circuit connected in series from its collector to a point of reference potential, a parallel RC circuit connected between its base and said point of reference potential, a parallel RC circuit connected in series with a radio frequency choke between its emitter and said point of reference potential, a capacitor connected between its emitter and its collector, and an output connected to the junction of said RC circuit and said choke, said antenna being connected in series with a capacitor to said point of reference potential, and being connected to said collector.

References Cited

UNITED STATES PATENTS

| | | | |
|---|---|---|---|
| 2,481,503 | 9/1949 | Dunbar | 318—16 |
| 2,556,556 | 6/1951 | Schmitt | 318—16 |
| 2,975,349 | 3/1961 | Green | 318—331 |
| 3,173,065 | 3/1965 | Fullerton | 307—233 XR |
| 3,262,018 | 7/1966 | Bogaerts | 307—264 XR |

OTHER REFERENCES

General Electric Transistor Manual, 7th ed., 1964, General Electric Co., pp. 289, 384.

ORIS L. RADER, Primary Examiner

A. G. COLLINS, Assistant Examiner